(12) United States Patent
Kashino et al.

(10) Patent No.: US 11,341,695 B2
(45) Date of Patent: May 24, 2022

(54) MOTION INFORMATION APPARATUS, METHOD THEREFOR, AND PROGRAM

(71) Applicant: NIPPON TELEGRAPH AND TELEPHONE CORPORATION, Tokyo (JP)

(72) Inventors: Makio Kashino, Kanagawa (JP); Naoki Saijo, Kanagawa (JP); Toshitaka Kimura, Kanagawa (JP); Daiki Nasu, Kanagawa (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/048,077

(22) PCT Filed: Feb. 14, 2019

(86) PCT No.: PCT/JP2019/005343
§ 371 (c)(1),
(2) Date: Oct. 15, 2020

(87) PCT Pub. No.: WO2019/202832
PCT Pub. Date: Oct. 24, 2019

(65) Prior Publication Data
US 2021/0166451 A1   Jun. 3, 2021

(30) Foreign Application Priority Data
Apr. 17, 2018  (JP) .............................. JP2018-079306

(51) Int. Cl.
G06T 11/20     (2006.01)
A63B 24/00     (2006.01)
(Continued)

(52) U.S. Cl.
CPC ........ *G06T 11/206* (2013.01); *A63B 24/0006* (2013.01); *A63B 69/0002* (2013.01);
(Continued)

(58) Field of Classification Search
CPC ...... G06T 11/206; G06T 11/20; G06F 3/0481; G06F 17/246; H04L 41/22
(Continued)

(56) References Cited

U.S. PATENT DOCUMENTS

2009/0280879 A1* 11/2009 Takahashi ............. A63F 13/812
                                                      463/3
2013/0244211 A1*  9/2013 Dowling ................ G16H 20/30
                                                      434/247

FOREIGN PATENT DOCUMENTS

JP     2015-221134     12/2015

OTHER PUBLICATIONS

Nasu, D. Time Structure of Baseball Batting during Real Matchup between Pitcher and Batter. The Brain and Neural Networks, vol. 24, No. 3 (2017). (Year: 2017).*
(Continued)

*Primary Examiner* — Gordon G Liu

(57) ABSTRACT

The appropriateness of a motion of a motion actor who makes a motion in response to a motion of at least one moving body other than him/herself is visualized. To display motion information of a motion actor who makes a motion in response to a motion of at least one moving body other than him/herself, an image showing one sequence which is visible or a plurality of sequences which are visible is output. In this case, a relative time which is a position on a relative time axis corresponds to a position on a specific axis of the image. The one sequence or each of the plurality of sequences graphically shows at least a position on the axis which corresponds to a moving body time that is a relative
(Continued)

time at which at least one predetermined motion of the moving body was made, and a position on the axis which corresponds to a motion actor time that is a relative time at which at least one predetermined motion of the motion actor was made.

12 Claims, 9 Drawing Sheets

(51) Int. Cl.
    *A63B 69/00*    (2006.01)
    *A63B 71/06*    (2006.01)
    *A63B 102/18*    (2015.01)
    *G06F 3/0482*    (2013.01)

(52) U.S. Cl.
    CPC .. *A63B 71/0622* (2013.01); *A63B 2024/0015* (2013.01); *A63B 2069/0008* (2013.01); *A63B 2071/0647* (2013.01); *A63B 2071/0694* (2013.01); *A63B 2102/18* (2015.10); *A63B 2220/05* (2013.01); *G06F 3/0482* (2013.01); *G06T 2200/24* (2013.01)

(58) Field of Classification Search
    USPC ......................................................... 345/440
    See application file for complete search history.

(56) References Cited

OTHER PUBLICATIONS

Nasu (2017) "Time Structure of Baseball Batting during Real Matchup between Pitcher and Batter", The Brain and Neural Networks, vol. 24, No. 3, pp. 132-137, Sep. 5, 2017 with its English translation generated by computer.

Nasu et al. (2017) "Cortical Planning and Execution: Reach and Grasp Neurophysiology," Neuroscience 2017, Oct. 18, 2017.

Nasu et al. (2017) "Perception-action linkage in top athletes during batting," Society for Neuroscience 2017 Annual Meeting, Nov. 14, 2017.

Kimura et al. (2017) "Virtual reality system to elucidate brain processing in an expert batter," IEICE Technical Report vol. 117 No. 375, pp. 31-34, Dec. 18, 2017 with its English translation generated by computer.

Nasu (2018) "Baseball batting analysis shows excellent timing adjustment of batters," NTT Technical Journal vol. 30 No. 1, pp. 18-21, Jan. 1, 2018 with its English translation generated by computer.

Kimura et al. (2018) "Utilizing Virtual Reality to Understand Athletic Performance and Underlying Sensorimotor Processing," ISEA 2018, Feb. 12, 2018.

Kobayashi et al. (2018) "Detecting and Sonifying Temporal Patterns of Body Segments When Batting," ISEA 2018, Feb. 14, 2018.

Nasu (2018) "Timing Adjustment of Baseball Batters Determined from Motion Analysis of Batting," NTT Technical Review, vol. 16 No. 3, Mar. 1, 2018.

Isogawa et al. (2018) "What Can VR Systems Tell Sports Players? Reaction-Based Analysis of Baseball Batters in Virtual and Real Worlds," IEEE Conference on Virtual Reality and 3D User Interfaces (VR), Mar. 18, 2018.

Isogawa et al. (2018) "What Can VR Systems Tell Sports Players? Reaction-Based Analysis of Baseball Batters in Virtual and Real Worlds," IEEE Xplore Digital Library, Aug. 30, 2018.

\* cited by examiner

FIG. 2

| No | User Name | Pitcher_Name | Ball Type | Ball Release | Zone Time |
|---|---|---|---|---|---|
| 1 | Sub028 | PIC01_test1 | Fastball | 3.21 | 0.4098937 |
| 2 | Sub028 | PIC01_test2 | Fastball | 3.33 | 0.4147999 |
| 3 | Sub028 | PIC01_test2 | Fastball | 4.52 | 0.4214792 |
| 4 | Sub028 | PIC01_test1 | Curveball | 5.27 | 0.504495 |
| 5 | Sub028 | PIC01_test1 | Curveball | 5.84 | 0.5111272 |
| 6 | Sub028 | PIC01_test2 | Curveball | 3.74 | 0.5111469 |

FIG. 6

MOTION INFORMATION APPARATUS, METHOD THEREFOR, AND PROGRAM

CROSS-REFERENCE TO RELATED APPLICATIONS

This application is a U.S. 371 Application of International Patent Application No. PCT/JP2019/005343, filed on 14 Feb. 2019, which application claims priority to and the benefit of JP Application No. 2018-079306, filed on 17 Apr. 2018, the disclosures of which are hereby incorporated herein by reference in their entireties.

TECHNICAL FIELD

The present invention relates to a technique of visualizing the motional state of a motion actor.

BACKGROUND ART

As a technique of visualizing the motional state of motion actors which are animals (including humans), there is a technique described in Patent Literature 1. According to Patent Literature 1, it is possible to visualize the appropriateness of a motion of a motion actor (an actor) and muscle activity associated with the motion.

PRIOR ART LITERATURE

Patent Literature

Patent Literature 1: Japanese Patent Application Laid Open No. 2015-221134

SUMMARY OF THE INVENTION

Problems to be Solved by the Invention

However, with the technique of Patent Literature 1, it is impossible to visualize the appropriateness of a motion made by a motion actor in response to a motion of at least one moving body other than him/herself, such as how appropriately a baseball batter can perform batting.

The present invention has been made in view of this point and an object thereof is to visualize the appropriateness of a motion of a motion actor who makes a motion in response to a motion of at least one moving body other than him/herself.

Means to Solve the Problems

In the present invention, to display motion information of a motion actor who makes a motion in response to a motion of at least one moving body other than him/herself, an image showing one sequence which is visible or a plurality of sequences which are visible is output. In this case, a relative time which is a position on a relative time axis corresponds to a position on a specific axis of the image. The one sequence or each of the plurality of sequences graphically shows at least a position on the axis which corresponds to a moving body time that is a relative time at which at least one predetermined motion of the moving body was made and a position on the axis which corresponds to a motion actor time that is a relative time at which at least one predetermined motion of the motion actor was made.

Effects of the Invention

This makes it possible to visualize the appropriateness of a motion made by a motion actor in response to a motion of at least one moving body other than him/herself.

BRIEF DESCRIPTION OF THE DRAWINGS

FIG. 2 is a diagram illustrating a search image of the embodiment.

FIG. 6 is a diagram illustrating a data list of the embodiment.

DETAILED DESCRIPTION OF THE EMBODIMENTS

Figure 1:
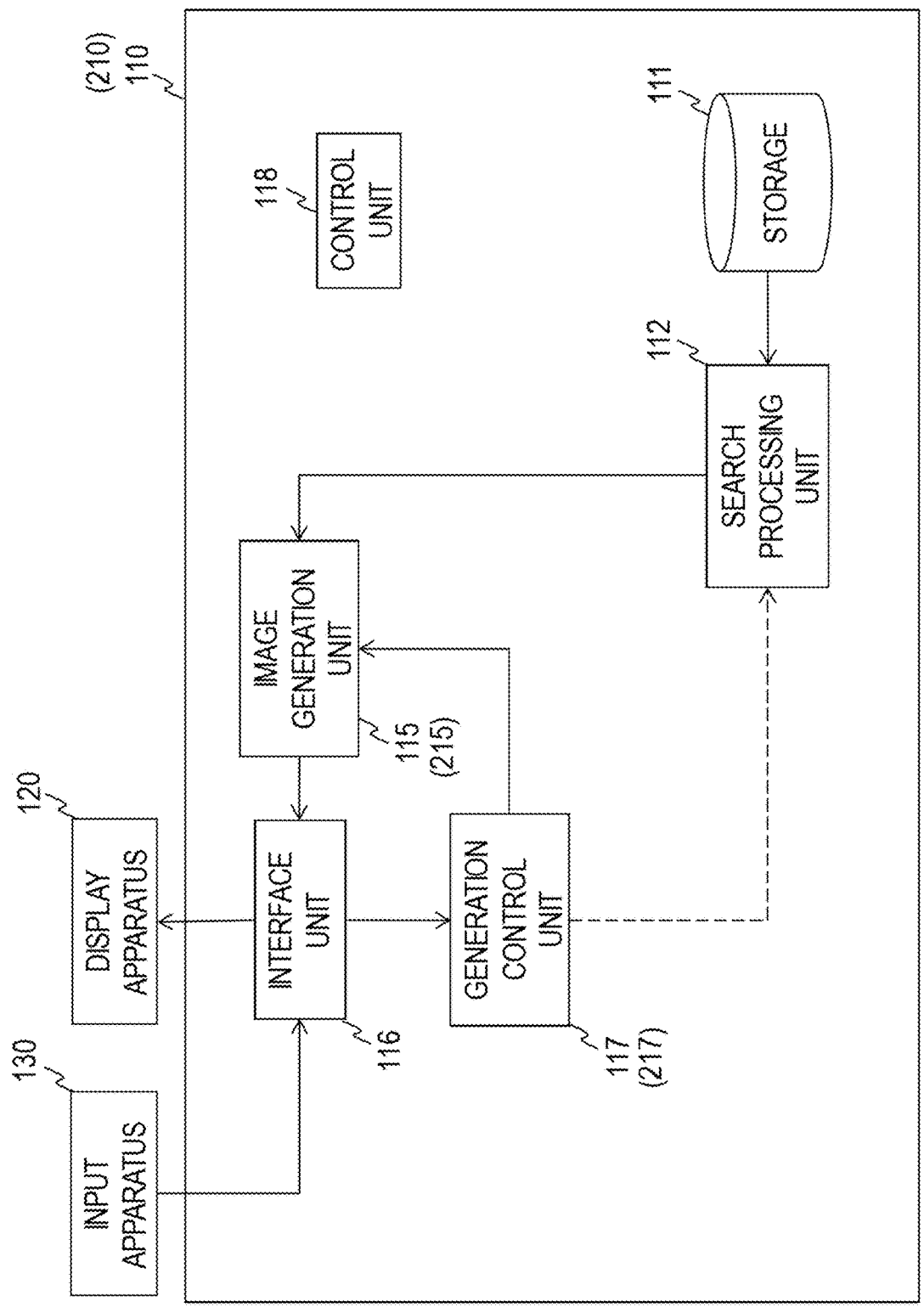
FIG. 1 is a block diagram illustrating the functional configuration of a motion information apparatus of an embodiment.
Figure 3:
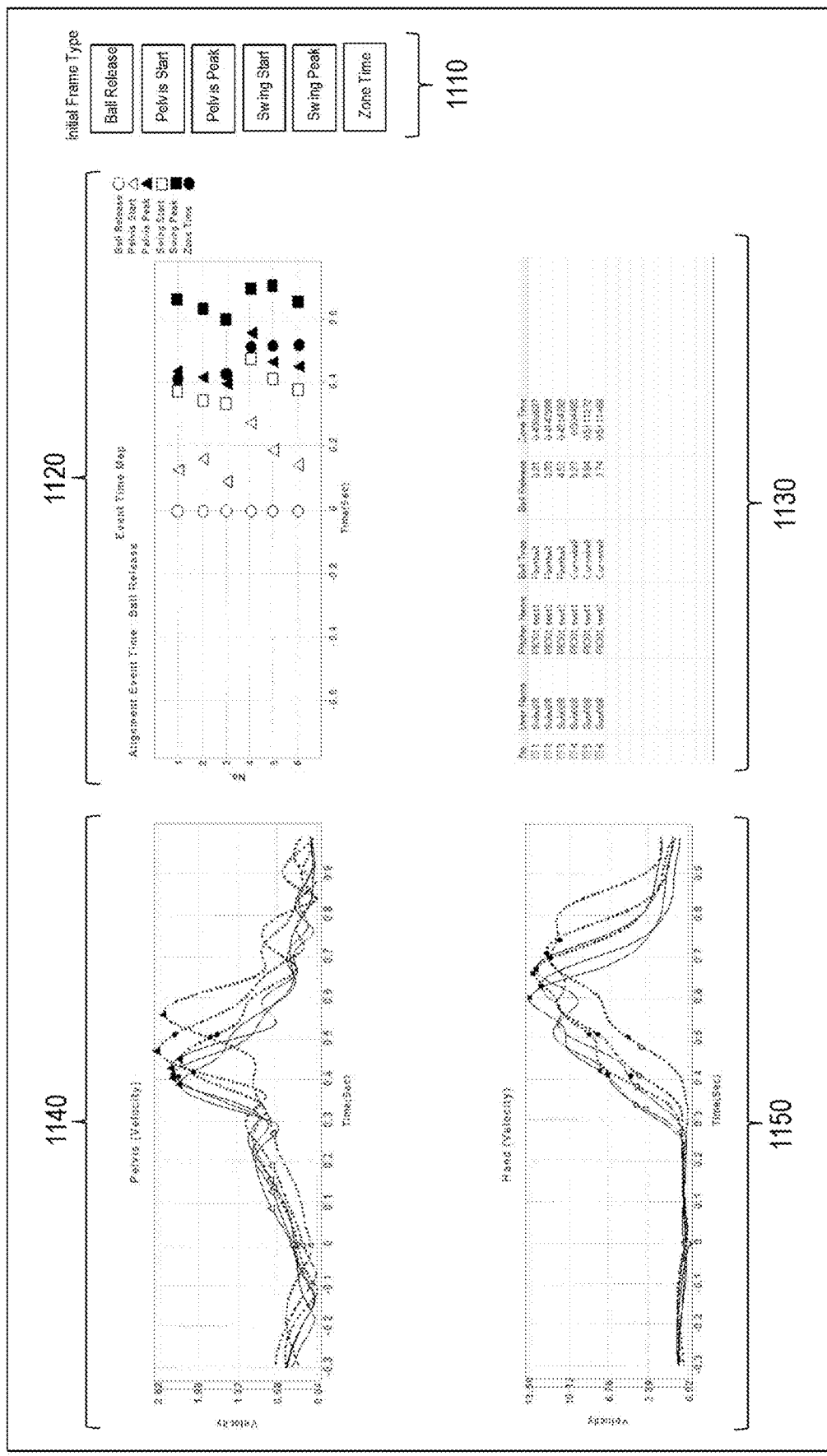
FIG. 3 is a diagram illustrating an image that visualizes records of the embodiment.

The present invention will be described by taking baseball as an example. The present invention relates to presentation of motion information by which, for a plurality of motions, each being a motion of a batter who performs batting in response to a ball thrown by a pitcher, the following relationships are displayed side by side: the relationships on the time axis among the time at which the pitcher threw the ball, the time at which the ball thrown by the pitcher arrived at a position in which the batter performs batting, and at least one of the time at which a rotary motion of the batter who performs batting in response to the ball thrown by the pitcher is started and the time at which the rotary motion reaches a maximum. That is, the present invention relates to presentation of motion information by which, for a plurality of motions, each being a motion of an animal that makes a motion in response to the movement of at least one moving body other than the animal, the relationships on the time axis between a representative time of the movement of the moving body and a representative time of the motion of the animal. In the case of baseball, "at least one moving body other than the animal" is a ball, "the movement of the moving body" is the movement of the flying ball, "an animal that makes a motion" is a batter who performs batting, "a representative time of the movement of the moving body" is the time at which a pitcher threw the ball and the time at which the ball thrown by the pitcher arrived at a position in which the batter performs batting, and "a representative time of the motion of the animal" is at least one of the time at which a rotary motion of the batter is started and the time at which the rotary motion reaches a maximum. Hereinafter, embodiments of the present invention will be described with reference to the drawings.

First Embodiment

In a first embodiment, first, the general outlines of a motion information apparatus are described, and the configuration and operation of the motion information apparatus are then described using baseball as an example.

[General Outlines]

The motion information apparatus outputs an "image" showing one "sequence" which is visible or a plurality of "sequences" which are visible to display motion information of "motion actors" that make a motion in response to a motion of at least one "moving body" other than themselves. In this case, the "motion actors" are "animals (including humans)". A "relative time" which is a position on a relative time axis corresponds to a "position on a specific axis" of an "image". The one "sequence" or each of the plurality of "sequences" graphically shows at least a "position on the axis" which corresponds to a "moving body time" that is a "relative time" at which at least one predetermined motion of a "moving body" was made, and a "position on the axis" which corresponds to a "motion actor time" that is a relative time at which at least one predetermined motion of a "motion actor" was made. This makes it possible to visualize a motion of the "moving body" and a motion of the "motion actor" on a time-series basis. As a result, it is possible to visualize the appropriateness of a motion of the "motion actor" who makes a motion in response to a motion of the "moving body".

A "motion" which a "motion actor" makes is a motion (for example, a "motion" that is made in accordance with the movement of a "moving body") that is made in response to the movement of at least one "moving body" other than the "motion actor". More specifically, a "motion" which an "animal" makes is a motion that is made in a scene in which a situation occurs where the "animal" has to coordinate his/her action with the movement of a "moving body" under time constraints in order to attain some kind of objective. Moreover, an evaluation of the motion performance of an "animal" means whether the "animal" can appropriately adjust a motion in the above-described scene and the degree thereof. The "moving body" may be an object (for example, a ball, a sword, a bamboo sword, or the like) other than a living thing, a part (for example, a hand, a foot, or the like) or the whole of the body of another animal, or a combination (for example, a fist wearing a boxing glove or the like) of an object and a part or the whole of the body of another animal. Examples of such a "motion" are: a batting motion in baseball, softball, or the like; a ball returning (stroke) motion in tennis, table tennis, or the like; a receiving motion in volleyball or the like; a motion of a keeper who is trying to stop a ball kicked by a kicker in the scene of a PK or free kick in soccer; a motion of an opponent player who is tackling to stop the movement of a player with a ball in rugby, American football, or the like; a defensive motion that is made in response to an attack from an opponent in fencing, kendo, boxing, or the like; and an avoiding motion made by a driver of an automobile in response to a bicycle that ran out in front of the automobile.

The motion information apparatus may output (display) an "image" by a display or the like of the motion information apparatus, project (output) an "image" onto a screen or the like from a projector of the motion information apparatus, output an "image" to an external apparatus provided with a display or projector, or output an "image" through a network.

A "relative time" may be a position on a relative time axis with respect to the point in time when a "moving body" started a motion, a position on a relative time axis with respect to the point in time when the motional state of the "moving body" reached a specific state, or a position on a relative time axis with respect to the point in time when the motional state of a "motion actor" who is responding to a motion of the "moving body" reached a specific state. The "relative time" may be actual time or a value corresponding to actual time.

A "relative time" corresponds to a "position on a specific axis" of an "image". A "position on an axis" may be a position on the time axis, which indicates actual time, or a position on an axis which indicates a value corresponding to actual time. An example of "a position on an axis which indicates a value corresponding to actual time" is the proportion ($\Delta t/(t2-t1)$) of the actual elapsed time ($\Delta t$) from a motion point in time t1 or a point in time t1+t0 near the motion point in time t1 in an actual time segment (t2−t1) from the motion point in time t1 of a "moving body" to a motion point in time t2 (where t2>t1). Here, t0 is a positive or negative constant. A "specific axis of an image" may be an axis that is parallel or substantially parallel to a coordinate axis (for example, the X-axis or the Y-axis of an X-Y coordinate system) of the "image" or an axis that is not parallel or substantially parallel to the coordinate axis of the "image". The "specific axis itself of an image" may be visible or invisible. A value (for example, an X coordinate value) indicated by a "position on an axis" may monotonically increase (or monotonically non-decrease) with an increase in a "relative time" or monotonically decrease (or monotonically non-increase) with an increase in the "relative time". For example, there is a linear relationship between a "relative time" and a value indicating a "position on an axis".

A "sequence" graphically shows a "position on an axis" which corresponds to a "moving body time" and a "position on the axis" which corresponds to a "motion actor time". For example, a "sequence" is a sequence of pieces of visible graphic information displayed (placed) in these "positions on the axis". The "pieces of visible graphic information" may be, for example, figures, markings (marks), or text. A piece of graphic information representing a "position on an axis" which corresponds to a "moving body time" and a piece of graphic information representing a "position on the axis" which corresponds to a "motion actor time" may be visually distinguishable from each other. Pieces of graphic information representing "positions on an axis" which correspond to a plurality of different "moving body times" may be visually distinguishable from one another. Likewise, pieces of graphic information representing "positions on the axis" which correspond to a plurality of different "motion actor times" may be visually distinguishable from one another. Examples of visually distinguishable pieces of graphic information are pieces of information with different shapes, sizes, thicknesses, fonts, colors, lightness, brightness, movements (for example, the movement of a mark that moves), or combinations of at least some of them. For example, "positions on an axis" which correspond to "motion actor times" and "positions on the axis" which correspond to "moving body times" are made distinguishable from one another by differences in the shapes and/or colors of marks.

When a plurality of "sequences" are displayed in an "image", it is preferable that the plurality of "sequences" are displayed side by side on different axes of the "image". The "different axes" are placed so as to be parallel or substantially parallel to one another, for example. Furthermore, it is preferable that "selection buttons" corresponding to a plurality of "relative times" including at least one "moving body time" and at least one "motion actor time" are also displayed in the image and, when any one of the "selection buttons" is pressed, the plurality of "sequences" are displayed in the "image" such that positions on the axes which correspond to a "relative time" corresponding to the pressed "selection button" in the plurality of "sequences" are aligned. This makes it possible to make visual comparison and evaluation of the timing of motions of a "moving body" and a "motion actor" with respect to a position corresponding to a "relative time" corresponding to a desired "selection button". It is to be noted that a state where "positions on the axes which correspond to a relative time corresponding to the pressed selection button in the plurality of sequences are aligned" is, for example, a state where the "positions on the axes" in these sequences are arranged in a straight line. For example, when "positions on the axes in the plurality of sequences" are positions on axes that are parallel or substantially parallel to the X-axis on the X-Y plane, a state where the "positions on the axes in the plurality of sequences" are aligned is a state where the "positions on the axes in the plurality of sequences" are arranged in a straight line so as to be parallel or substantially parallel to the Y-axis. Moreover, the positions on the axes in a state where the "positions on the axes in the plurality of sequences" are aligned may be set as the origin positions of the axes.

A case where motion information of a "batter" who makes a "batting motion" in response to a "pitch" is displayed will be illustrated. In this case, the motion information apparatus outputs an "image" showing the following visible "sequence" or "sequences". This "sequence" graphically shows at least a "position on an axis" which corresponds to a "pitch time (moving body time)" that is a "relative time" at which a certain "pitch" was made to a certain "batter (motion actor)", a "position on the axis" which corresponds to an "arrival time (moving body time)" that is a "relative time" at which a ball (a moving body) which is thrown by the certain "pitch" reached a predetermined position near a batter's box where the certain "batter" stands, and a position on the axis which corresponds to a "motion actor time" that is a "relative time" at which a rotary motion of a part of the body of the certain "batter" or an object that moves with the part of the body was started in response to the certain "pitch". This makes it possible to visualize a motion of a pitcher (a moving body) and/or a ball (a moving body) associated with a pitch and a batting motion of a "batter" on a time-series basis.

A "relative time" is a position on a relative time axis with respect to a "base point in time". An example of a "base point in time" is the point in time when a pitch instruction was provided to a pitcher. Another example of a "base point in time" is, for example, a specific point in time in a series of pitcher's pitch motions (for instance, raising his/her leg, moving forward, planting his/her foot on the ground, and a ball release). Examples of this point in time are the point in time when a pitcher's front foot (a left foot if a pitcher is a right-handed pitcher) was moved away from the ground, the point in time when the knee of a front leg reached the highest position, the point in time when the front foot touched the ground, and a ball release point in time (the point in time when a ball was released from a pitcher's hand). Alternatively, the point in time when the thrown ball reached a specific position (for example, the point in time when the ball reached a position a predetermined distance from a pitcher's plate, the point in time when the ball reached a predetermined position on a home base (for instance, the front end or the like of the home base), the point in time when the ball reached a position a predetermined distance from the home base, or the point in time when the ball reached the position of a catcher's mitt) may be set as a "base point in time". In addition to those described above, a specific point in time in a batting motion which is made by a batter in response to a pitch may be set as a "base point in time". Examples of a specific point in time in a batting motion are the point in time when the rotation of the waist of a batter was started, the point in time when the rotation of the waist reached a maximum (for example, when the angular speed, tangential velocity, angular acceleration, tangential acceleration, or the like of the waist reached a maximum), the point in time when the movement of a hand was started, and the point in time when the movement of the hand reached a maximum (for example, when the angular speed, tangential velocity, angular acceleration, tangential acceleration, or the like of the hand reached a maximum).

An example of a "relative time" at which a "pitch" was made may be a specific point in time in a series of pitcher's pitch motions with respect to a "base point in time" (that is, with the time of a base point in time being set at zero) or the point in time when the thrown ball arrived at a specific position. Only one "pitch time (for instance, a ball release point in time or the like)" may be shown for one "pitch" in a "sequence", or a plurality of "pitch times (such as the point in time when a front foot was moved away from the ground, the time when the knee of a front leg reached the highest position, the point in time when the front foot touched the ground, and a ball release point in time)" may be shown for one "pitch" in a "sequence".

Examples of "a predetermined position near a batter's box" are a predetermined position on the home base (for instance, the front end or the like of the home base), a position a predetermined distance from the home base, and the position of the catcher's mitt. An example of an "arrival time" is the point in time when a ball arrived at "a predetermined position near a batter's box" with respect to a "base point in time".

Examples of a part of the body of a "batter" are the waist and a hand of the "batter". Examples of an object that moves with the part of the body of the "batter" are a bat and a tool that is grasped in place of a bat. Examples of a "motion actor time" of a "batter" who makes a "batting motion" are the point in time when the rotation of the waist was started with respect to a "base point in time", the point in time when the rotation of the waist reached a maximum (for example, when the angular speed, tangential velocity, angular acceleration, tangential acceleration, or the like of the waist reached a maximum) with respect to the "base point in time", the point in time when the movement of a hand was started with respect to the "base point in time", and the point in time when the movement of the hand reached a maximum (for example, when the angular speed, tangential velocity, angular acceleration, tangential acceleration, or the like of the hand reached a maximum) with respect to the "base point in time". Only one "motion actor time (such as the point in time when the rotation of the waist was started)" may be shown for one "batting" in a "sequence", or a plurality of "motion actor times (such as the point in time when the rotation of the waist was started, the point in time when the rotation of the waist reached a maximum, the point in time when the movement of a hand was started, and the point in time when the movement of the hand reached a maximum)" may be shown for one "batting" in a "sequence".

Moreover, a plurality of "sequences" may be displayed side by side on different axes of an "image", "selection buttons" corresponding to a plurality of relative times including a "pitch time", an "arrival time", and at least one "motion actor time" may also be displayed in the image, and, when any one of the "selection buttons" is pressed, the plurality of "sequences" may be displayed in the "image"

such that positions on the axes, which correspond to a "relative time" corresponding to the pressed "selection button", in the plurality of "sequences" are aligned. This makes it possible to make visual comparison and evaluation of the timing of, for example, motions of a pitch, a thrown ball, and a "batter" with respect to a position corresponding to a "relative time" corresponding to a desired "selection button".

A plurality of "sequences" may include a "first sequence" and a "second sequence" of one batter who responds to different pitch types and these sequences may be displayed side by side on different axes of an "image". That is, the "first sequence" is a sequence graphically showing at least a "position on an axis" which corresponds to a "pitch time" that is a "relative time" at which a pitch of a "first pitch type (for instance, a straight ball (a fast ball) or the like)" was made to a "first batter", a "position on the axis" which corresponds to an "arrival time" that is a "relative time" at which a ball of the "first pitch type" reached a predetermined position near a batter's box where the "first batter" stands, and a "position on the axis" which corresponds to a "motion actor time" that is a "relative time" at which a rotary motion of a part of the body of the "first batter" or an object that moves with the part of the body was started in response to the pitch of the "first pitch type". Moreover, the "second sequence" is a sequence graphically showing at least a "position on an axis" which corresponds to a "pitch time" that is a "relative time" at which a pitch of a "second pitch type (for instance, a curveball (a curve ball) or the like)", which is different from the "first pitch type", was made to the "first batter", a "position on the axis" which corresponds to an "arrival time" that is a "relative time" at which a ball of the "second pitch type" reached the predetermined position near the batter's box where the "first batter" stands, and a position on the axis which corresponds to a "motion actor time" that is a "relative time" at which a rotary motion of the part of the body of the "first batter" or the object that moves with the part of the body was started in response to the pitch of the "second pitch type".

Furthermore, another piece of "graphical information" which is visible or other pieces of "graphical information" which are visible may be displayed in an "image". "Graphical information" is information graphically showing, for example, a physical quantity at each relative time of a "motion" which a "motion actor" makes. An example of "graphical information" is information graphically showing a physical quantity which indicates a rotary motion of a part of the body of a "batter" or an object that moves with the part of the body at each relative time. An example of "graphical information" is a graph. For example, a "relative time" corresponds to a position ($X_2$) on a specific "second axis" of an "image" and a "physical quantity" corresponds to a position ($Y_2$) on a specific "third axis" that is orthogonal or substantially orthogonal to the "second axis". In this case, "graphical information" is, for example, a graph that is obtained by making a plot of the two-dimensional coordinates ($X_2$, $Y_2$) of a position corresponding to the "physical quantity" at each "relative time". It is to be noted that a value (for example, an X coordinate value) indicated by a "position on the second axis" may monotonically increase (or monotonically non-decrease) with an increase in a "relative time" or monotonically decrease (or monotonically non-increase) with an increase in the "relative time". For example, there is a linear relationship between a "relative time" and a value indicating a "position on the second axis". Moreover, examples of a "physical quantity" which indicates a rotary motion of a part of the body of a "batter" or an object that moves with the part of the body at each "relative time" are: the position, angular speed, tangential velocity, angular acceleration, or tangential acceleration of the waist of the "batter"; the speed, tangential velocity, angular acceleration, or tangential acceleration of a hand; and the position, speed, tangential velocity, angular acceleration, or tangential acceleration of a bat head.

These multiple pieces of "graphical information" and selection buttons corresponding to a plurality of "relative times" including a "pitch time", an "arrival time", and at least one "motion actor time" may be displayed in an "image". In this case, a "relative time" corresponds to a position on a specific "second axis" of the "image", and, when any one of the "selection buttons" is pressed, the pieces of "graphical information" may be displayed in the image such that positions (for example, positions corresponding to a "motion actor time") on the "second axes" which correspond to a "relative time" corresponding to the pressed "selection button" in the pieces of "graphical information" are aligned. This makes it possible to make visual comparison and evaluation of the above-described physical quantity of a "rotary motion" with respect to a position corresponding to a "relative time" corresponding to a desired "selection button". It is to be noted that a "specific second axis of an image" may be an axis that is parallel or substantially parallel to a coordinate axis (for example, the X-axis or the Y-axis of an X-Y coordinate system) of the "image" or an axis that is not parallel or substantially parallel to the coordinate axis of the "image". The "specific second axis itself of an image" may be visible or invisible. A state where "positions on the second axes which correspond to a relative time corresponding to the pressed selection button in the pieces of graphical information are aligned" is, for example, a state where the "positions (for example, positions corresponding to a "motion actor time") on the second axes" in these pieces of graphical information are arranged in a straight line. For example, when "positions on the second axes in the pieces of graphical information" are positions on axes that are parallel or substantially parallel to the X-axis on the X-Y plane, a state where the "positions on the second axes in the pieces of graphical information" are aligned is a state where the "positions (for example, positions corresponding to a "motion actor time") on the second axes in the pieces of graphical information" are arranged in a straight line so as to be parallel or substantially parallel to the Y-axis. Moreover, the positions on the second axes in a state where the "positions on the second axes in the pieces of graphical information" are aligned may be set as the origin positions.

Furthermore, in a position which corresponds to at least one "motion actor time" in a piece of "graphical information", a piece of "visible graphic information" corresponding to a position on an axis which corresponds to the "motion actor time" in a corresponding "sequence" may be displayed. Examples of "visible graphic information" have been described earlier. For example, when a certain mark (for instance, a ○ mark) is displayed in a position on an axis which corresponds to the "motion actor time" in a "sequence", the same mark (for instance, a ○ mark) may be displayed in a position which corresponds to the "motion actor time" in a piece of "graphical information". This visualizes the timing correlation between a "sequence" and "graphical information", which makes it possible to clearly grasp the motional state of a "motion actor (for example, a batter)".

In addition, a "sequence" may graphically show, in addition to those described above, a "position on an axis" which corresponds to a "pitch motion time" that is a "relative time" of a specific point in time in a series of pitcher's pitch motions (for instance, raising his/her leg, moving forward, planting his/her foot on the ground, and a ball release). Examples of "a specific point in time in pitch motions" are the point in time when a pitcher's front foot (a left foot if a pitcher is a right-handed pitcher) was moved away from the ground, the point in time when the knee of a front leg reached the highest position, the point in time when the front foot touched the ground, and a ball release point in time (the point in time when a ball was released from a pitcher's hand).

[Configuration and Operation of the Motion Information Apparatus]

Next, the configuration and operation (that is, motion information output processing) of the motion information apparatus of the first embodiment will be described.

<Configuration>

<<Motion Information Apparatus 110>>

As illustrated in FIG. 1, a motion information apparatus 110 of the present embodiment includes a storage 111, a search processing unit 112, an image generation unit 115, an interface unit 116, a generation control unit 117, and a control unit 118. The interface unit 116 is connected to an input apparatus 130 and a display apparatus 120.

The input apparatus 130 is an apparatus that accepts information input. Examples of the input apparatus 130 are a touch panel, a mouse, a keyboard, and a microphone. The display apparatus 120 is an apparatus that outputs an image in a visible manner. Examples of the display apparatus 120 are a display and a projector.

<<Storage of Motion Data>>

Batting data, which is data acquired when a batter performed batting in response to a ball thrown by a pitcher, is stored in the storage 111 in advance. The storage 111 is, for example, a magnetic recording device, an optical disk, a magneto-optical recording medium, or semiconductor memory, and the batting data is stored as an electronic file of a table made up of a plurality of records, for example. Each record of the table stored in the storage 111 is, for example, a record obtained by correlating a date and time, a pitcher identifier, a batter identifier, a pitch type, a pitch time, an arrival time, a motion actor time, and time-series motion data of each batting data with one another. Hereinafter, each data contained in the record will be described.

A date and time (Date) is a date and time of batting performed by a batter in response to a ball thrown by a pitcher, a pitcher identifier (Pitcher Name) is the name of the pitcher who threw the ball at this date and time, a batter identifier (User Name) is the name of the batter who performed the batting at this date and time, and a pitch type (Ball Type) is the name of the pitch type of the ball thrown by the pitcher at this date and time.

The data contained in the record includes data on the following time (A) and time (B) as a time about a ball thrown by a pitcher.

(A) Pitch Time (Ball Release)

A pitch time is the time at which a pitcher threw a ball and is sometimes written as "br" in the following description. In the following description, the pitch time br is a relative time of a ball release time with respect to a "base point in time". An example of a "base point in time" is a ball release time.

(B) Arrival Time (Zone Time)

An arrival time is the time at which a ball thrown by a pitcher arrived at a position in which a batter performs batting and is sometimes written as "zt" in the following description. In the following description, the arrival time zt is a relative time with respect to a "base point in time" of the time at which a ball thrown by a pitcher arrived at the front end of a home base.

The data contained in the record includes data on the following times (C) to (F) as a motion actor time, that is, a time about batting which is performed by a batter in response to a ball thrown by a pitcher.

(C) Waist-Related Motion Actor Time (Pelvis Start)

One waist-related motion actor time is the time (a waist rotation starting time) at which the rotation of the waist was started in a motion of a batter performing batting in response to a ball thrown by a pitcher, and is sometimes written as "ps" in the following description. The waist-related motion actor time ps (the waist rotation starting time) is, for example, the time at which the magnitude of a physical quantity of motion data which indicates a rotary motion of the waist of a batter exceeded a predetermined threshold; for example, the waist-related motion actor time ps (the waist rotation starting time) is the time at which the magnitude of the movement of the waist of a batter exceeded a predetermined threshold, the time at which the magnitude of a velocity vector derived from a physical quantity indicating a rotation speed of the waist of a batter exceeded a predetermined threshold, or the time at which the magnitude of a velocity vector derived from a physical quantity indicating the angular speed of the waist of a batter exceeded a predetermined threshold. In the following description, the waist-related motion actor time ps (the waist rotation starting time) is a relative time, with respect to a "base point in time", of the time at which a physical quantity indicating a rotation speed of the waist exceeded a predetermined threshold.

(D) Waist-Related Motion Actor Time (Pelvis Peak)

Another waist-related motion actor time is the time (a maximum waist rotation time) at which the rotation of the waist reached a maximum in a motion of a batter performing batting in response to a ball thrown by a pitcher, and is sometimes written as "pp" in the following description. The waist-related motion actor time pp (the maximum waist rotation time) is, for example, the time at which a physical quantity of motion data, which indicates a rotary motion of the waist of a batter, reached a maximum. The above-described magnitude (for example, the magnitude of the angular speed or angular acceleration) of a physical quantity indicating a rotation of the waist gradually increases after the start of the rotary motion of the waist, reaches a maximum value (a peak), and then decreases. The maximum waist rotation time is the time at which the above-described magnitude reached a maximum value. In the following description, the waist-related motion actor time pp (the maximum waist rotation time) is a relative time, with respect to a "base point in time", of the time at which a physical quantity indicating a rotation speed of the waist reached a maximum.

(E) Hand-Related Motion Actor Time (Swing Start)

One hand-related motion actor time is the time (a swing starting time) at which the rotation of a hand was started in a motion of a batter performing batting in response to a ball thrown by a pitcher, and is sometimes written as "ss" in the following description. The hand-related motion actor time ss (the swing starting time) is the time at which the magnitude of a physical quantity of motion data, which indicates a rotary motion of a hand of a batter or a bat, exceeded a predetermined threshold. Examples of a physical quantity indicating a rotary motion of a hand or a bat are similar to the examples of a physical quantity indicating a rotary motion of the waist, and a method for determining the swing starting time is similar to a method for determining the waist rotation starting time. In the following description, the hand-or-bat-related motion actor time ss (the swing starting time) is a relative time, with respect to a "base point in time", of the time at which a physical quantity indicating a rotation speed of a hand or a bat exceeded a predetermined threshold.

(F) Hand-Related Motion Actor Time (Swing Peak)

Another hand-related motion actor time is the time (a maximum swing time) at which the rotation of a hand or a bat reached a maximum in a motion of a batter performing batting in response to a ball thrown by a pitcher, and is sometimes written as "sp" in the following description. The hand-related motion actor time sp (the maximum swing time) is, for example, the time at which a physical quantity of motion data, which indicates a rotary motion of a hand of a batter or a bat, reached a maximum. A method for determining the maximum swing time is similar to a method for determining the maximum waist rotation time. In the following description, the hand-related motion actor time sp (the maximum swing time) is a relative time, with respect to a "base point in time", of the time at which a physical quantity indicating a rotation speed of a hand or a bat reached a maximum.

The data contained in the record includes, as time-series motion data, time-series data of a physical quantity indicating a rotary motion of the waist in batting which is performed by a batter in response to a ball thrown by a pitcher and time-series data of a physical quantity indicating a rotary motion of a hand or a bat in batting which is performed by a batter in response to a ball thrown by a pitcher.

<Motion Information Output Processing>

In motion information output processing, the records, which were obtained in the above-described manner, of the table are visualized.

<<Search Processing (Step S112)>>

Figure 2:
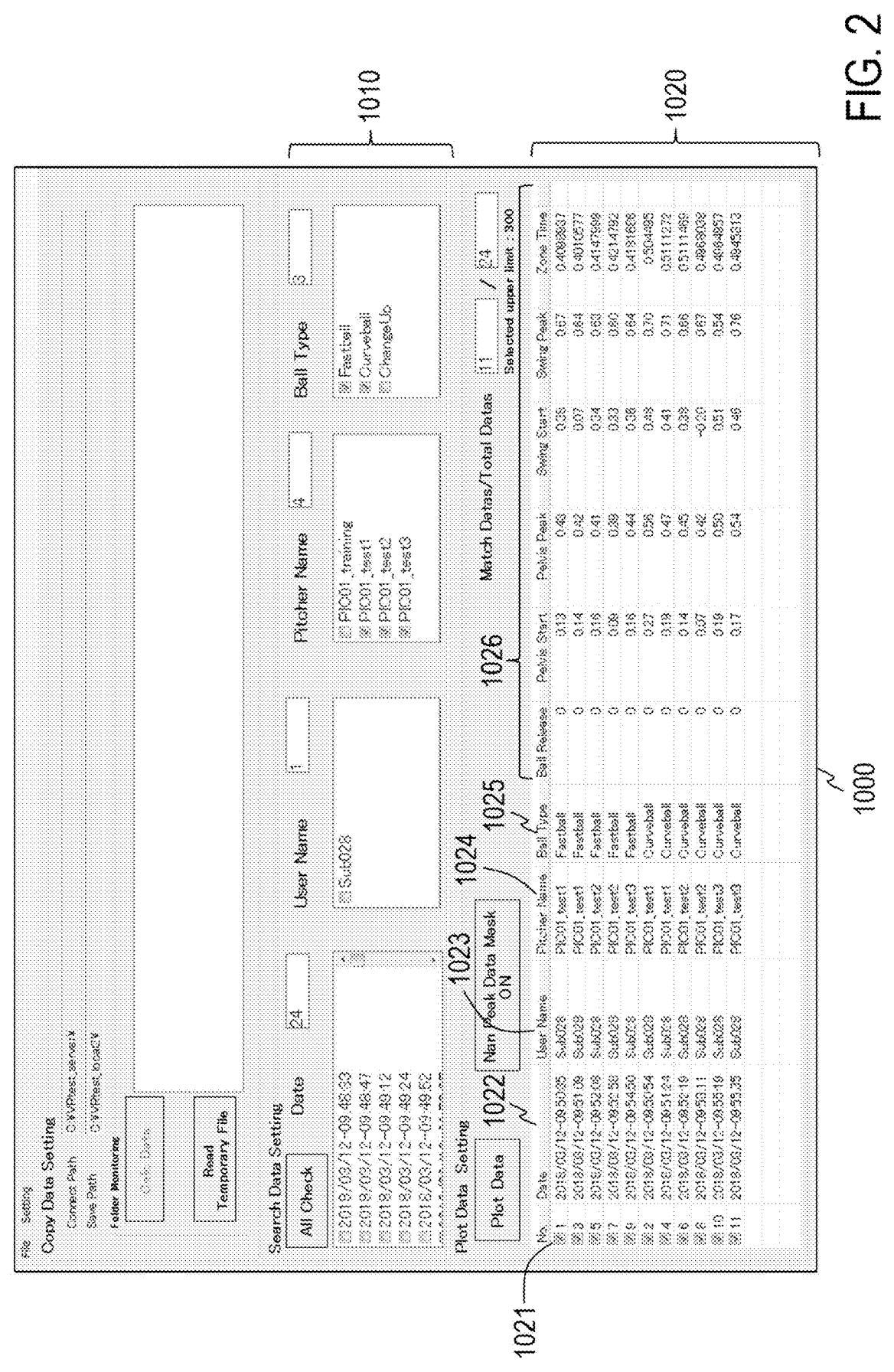

The search processing unit 112 retrieves information of the table from the storage 111, generates a search image 1000 for selection of a record to be visualized of the records contained in the table, and transmits the search image 1000 to the interface unit 116. The interface unit 116 transmits the search image 1000 to the display apparatus 120, and the display apparatus 120 displays the search image 1000. The search image 1000 illustrated in FIG. 2 includes a retrieval condition entry field 1010 in which a retrieval condition is entered and a list display field 1020 in which a list of records matching the retrieval condition is displayed. The list display field 1020 of FIG. 2 includes a record selection field 1021, a date and time display field 1022, a pitcher identifier display field 1024, a batter identifier display field 1023, a pitch type display field 1025, and a display field 1026 in which the pitch time br, the arrival time zt, and the motion actor times ps, pp, ss, and sp are displayed. A user retrieves a desired record by entering a retrieval condition in the retrieval condition entry field 1010 from the input apparatus 130. A list of records matching the retrieval condition is displayed in the list display field 1020, and the user selects a record to be visualized by making an entry in the selection field 1021 from the input apparatus 130. Information for identification of the selected record is transmitted to the search processing unit 112. The search processing unit 112 retrieves the selected record from the storage 111. The selected record is transmitted to the image generation unit 115.

<<Image Generation Processing (Step S115)>>

The image generation unit 115 generates an image 1100 that visualizes the record transmitted thereto.

<<Image Output Processing (Step S116)>>

The image generation unit 115 transmits the generated image 1100 to the interface unit 116, and the interface unit 116 transmits the image 1100 to the display apparatus 120. The display apparatus 120 outputs the image 1100, which was transmitted thereto, in a visual and visible way (for instance, displays the image 1100).

As illustrated in FIGS. 3 to 6, the image 1100 includes a selection button field 1110, an event time map field 1120, a record information display field 1130, and graph display fields 1140 and 1150. In the following description, the details of display in each field included in the image 1100, which is generated by the image generation unit 115 and displayed by the display apparatus 120, will be described.

Figure 4:
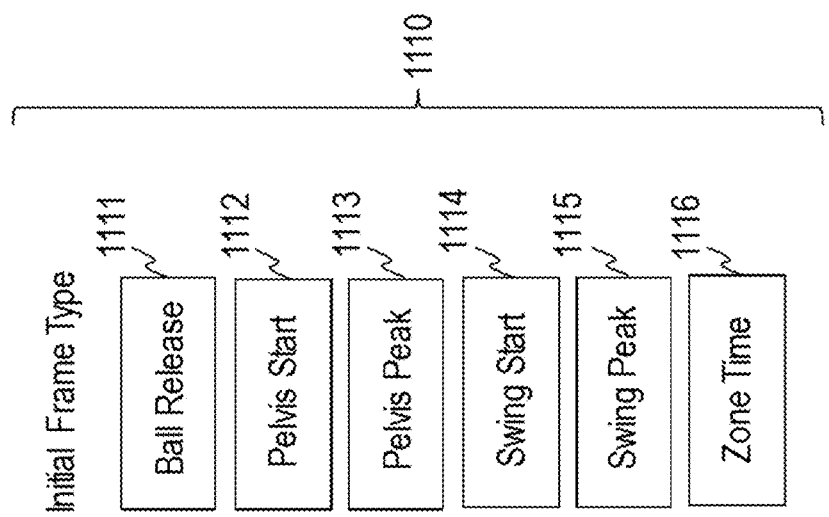
FIG. 4 is a diagram illustrating selection buttons of the embodiment.

Selection Button Field 1110:

As illustrated in FIG. 4, in the selection button field 1110, selection buttons 1111 to 1116 corresponding to a plurality of relative times including the pitch time br, the arrival time zt, and at least one motion actor time of the motion actor times ps, pp, ss, and sp are displayed. In the example of FIG. 4, the selection button 1111 (Ball Release) corresponding to the pitch time br, the selection button 1112 (Pelvis Start) corresponding to the motion actor time ps, the selection button 1113 (Pelvis Peak) corresponding to the motion actor time pp, the selection button 1114 (Swing Start) corresponding to the motion actor time ss, the selection button 1115 (Swing Peak) corresponding to the motion actor time sp, and the selection button 1116 (Zone Time) corresponding to the arrival time zt are displayed.

Figure 5:
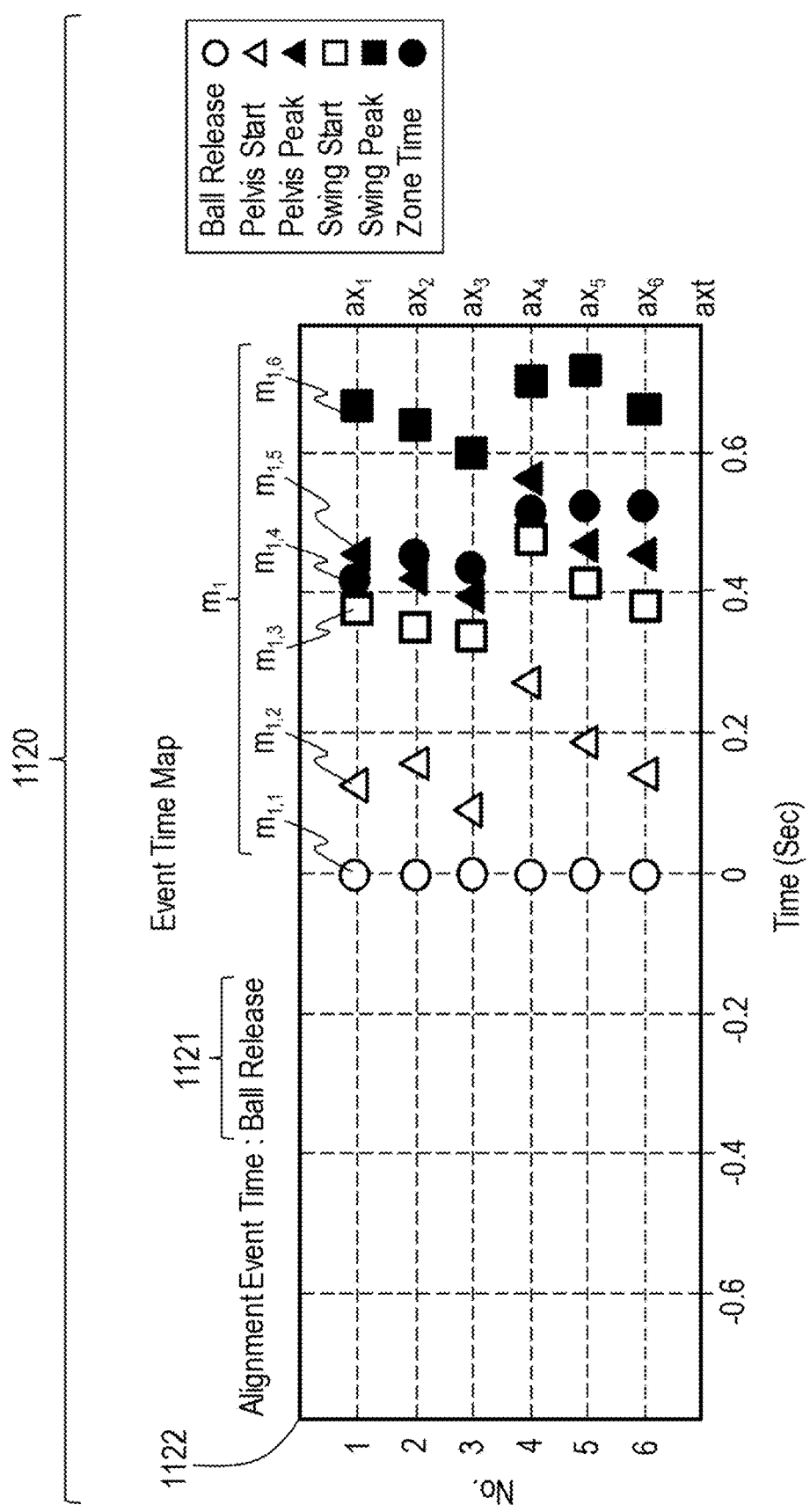
FIG. 5 is a diagram illustrating mark sequences (visible sequences) of the embodiment.

Event Time Map Field 1120:

As illustrated in FIG. 5, the event time map field 1120 includes a base relative time field 1121 and a map field 1122. In the map field 1122, a visible sequence $m_i$ corresponding to a selected record is displayed. Here, $i=1, \ldots, I$ holds and I is a positive integer. In the example of FIG. 5, I=6 holds and six sequences $m_1, \ldots, m_6$ corresponding to six records are displayed. The sequence $m_i$ is a sequence of J marks (pieces of visible graphic information) $m_{i,1}, \ldots, m_{i,J}$, and each mark $m_{i,j}$ corresponds to a corresponding one of at least the pitch time br, the arrival time zt, and the motion actor time ps and/or the motion actor time ss. It is assumed that J is an integer greater than or equal to 3 and $j=1, \ldots, J$ holds. In the example of FIG. 5, J=6 holds. Each mark $m_{i,j}$ in the example of FIG. 5 corresponds to a corresponding one of the pitch time br, the arrival time zt, and the motion actor times ps, pp, ss, and sp. In this example, the pitch time br corresponds to a mark $m_{i,1}$ (Ball Release), the motion actor time ps corresponds to a mark $m_{i,2}$ (Pelvis Start), the motion actor time ss corresponds to a mark $m_{i,3}$ (Swing Start), the arrival time zt corresponds to a mark $m_{i,4}$ (Zone Time), the motion actor time pp corresponds to a mark $m_{i,5}$ (Pelvis Peak), and the motion actor time sp corresponds to a mark $m_{i,6}$ (Swing Peak).

Sequences $m_1, \ldots, m_I$ are respectively displayed side by side on different axes $ax_1, \ldots, ax_I$ of the image 1100. The axes $ax_1, \ldots, ax_I$ are axes that are different from a time axis axt and parallel or substantially parallel to the time axis axt. In the example of FIG. 5, each axis $ax_i$ is a horizontal axis (an axis that is parallel to the X-axis on the X-Y plane). Relative times (for example, the pitch time br, the arrival time zt, and the motion actor times ps, pp, ss, and sp) correspond to positions on the axis $ax_i$. In the example of FIG. 5, an X coordinate value indicating each position on each axis $ax_i$ monotonically increases with an increase in a relative time, and there is a linear relationship between the X coordinate value and the relative time. The mark $m_{i,1}$ is placed in a position on the axis $ax_i$, which corresponds to the pitch time br, the mark $m_{i,\ 2}$ is placed in a position on the axis $ax_i$, which corresponds to the motion actor time ps, the mark $m_{i,\ 3}$ is placed in a position on the axis $ax_i$, which corresponds to the motion actor time ss, the mark $m_{i,\ 4}$ is placed in a position on the axis $ax_i$, which corresponds to the arrival time zt, the mark $m_{i,\ 5}$ is placed in a position on the axis $ax_i$, which corresponds to the motion actor time pp, and the mark $m_{i,\ 6}$ is placed in a position on the axis $ax_i$, which corresponds to the motion actor time sp. That is, the sequence $m_i$ graphically shows a position on the axis $ax_i$ which corresponds to the pitch time br, a position on the axis $ax_i$ which corresponds to the arrival time zt, and positions on the axis $ax_i$ which correspond to the motion actor times ps, pp, ss, and sp.

As described above, since there is a linear relationship between an X coordinate value indicating each position on each axis $ax_i$ and a relative time, the relative positional relationship between positions on the axis $ax_i$, which correspond to the pitch time br, the arrival time zt, and the motion actor times ps, pp, ss, and sp, is uniquely determined by the pitch time br, the arrival time zt, and the motion actor times ps, pp, ss, and sp. On the other hand, absolute positions (that is, X coordinate values) on the axis $ax_i$, which correspond to the pitch time br, the arrival time zt, and the motion actor times ps, pp, ss, and sp, are determined only after the determination of a relative time corresponding to a reference position (for example, the time origin) on the axis $ax_i$. It is to be noted that each axis $ax_i$ has the same reference position (that is, the same X coordinate) thereon and the reference position on each axis $ax_i$ corresponds to the same relative time. In the present embodiment, an example is shown in which the reference position is the time origin on the axis $ax_i$ and the time origin on the axis $ax_i$ corresponds to the pitch time br in the initial state. In this case, as illustrated in FIG. 5, a mark $m_{i,\ 1}$ which corresponds to the pitch time br in each sequence $m_i$ (a position on an axis, which corresponds to the pitch time br, in each sequence $m_i$) lies at the time origin on each axis $ax_i$. That is, each mark $m_{i,\ 1}$ corresponding to the pitch time br is placed at the time origin on each axis $ax_i$ in a linear arrangement. Moreover, the type of a relative time corresponding to a reference position (for example, the time origin) is displayed in the base relative time field 1121. In the example of FIG. 5, "Ball Release" indicating the type of the pitch time br is displayed in the base relative time field 1121.

Record Information Display Field 1130:

As illustrated in FIG. 6, in the record information display field 1130, a display field 1131 that shows an axis number i representing an axis $ax_i$ corresponding to a record to be visualized, a display field 1132 that shows a batter identifier, a display field 1133 that shows a pitcher identifier, a display field 1134 that shows a pitch type, a display field 1135 that shows the pitch time br, and a display field 1136 that shows the arrival time zt are displayed.

Figure 7:
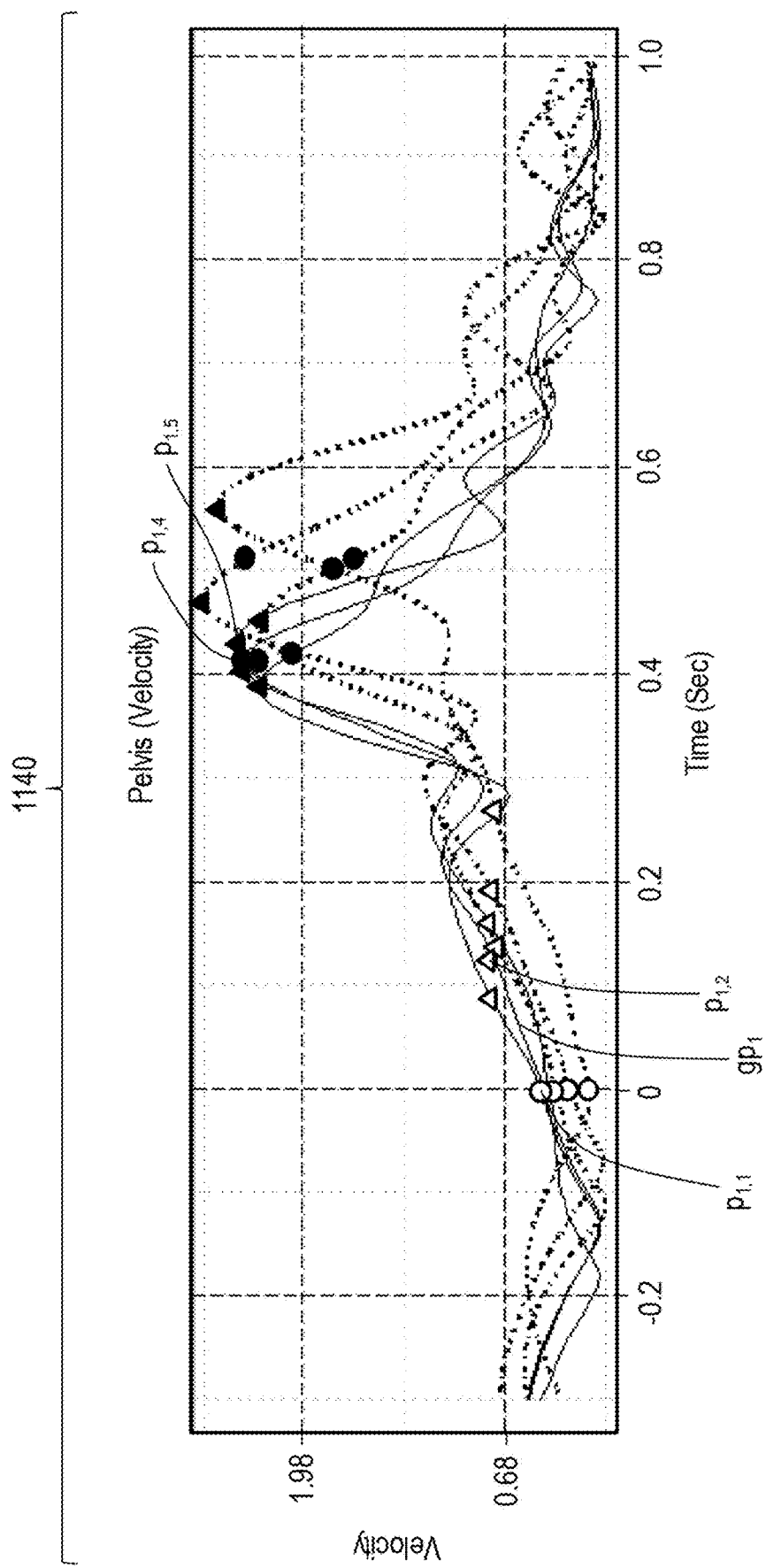
FIG. 7 is a diagram illustrating graphs (graphical information) of the embodiment.
Figure 8:
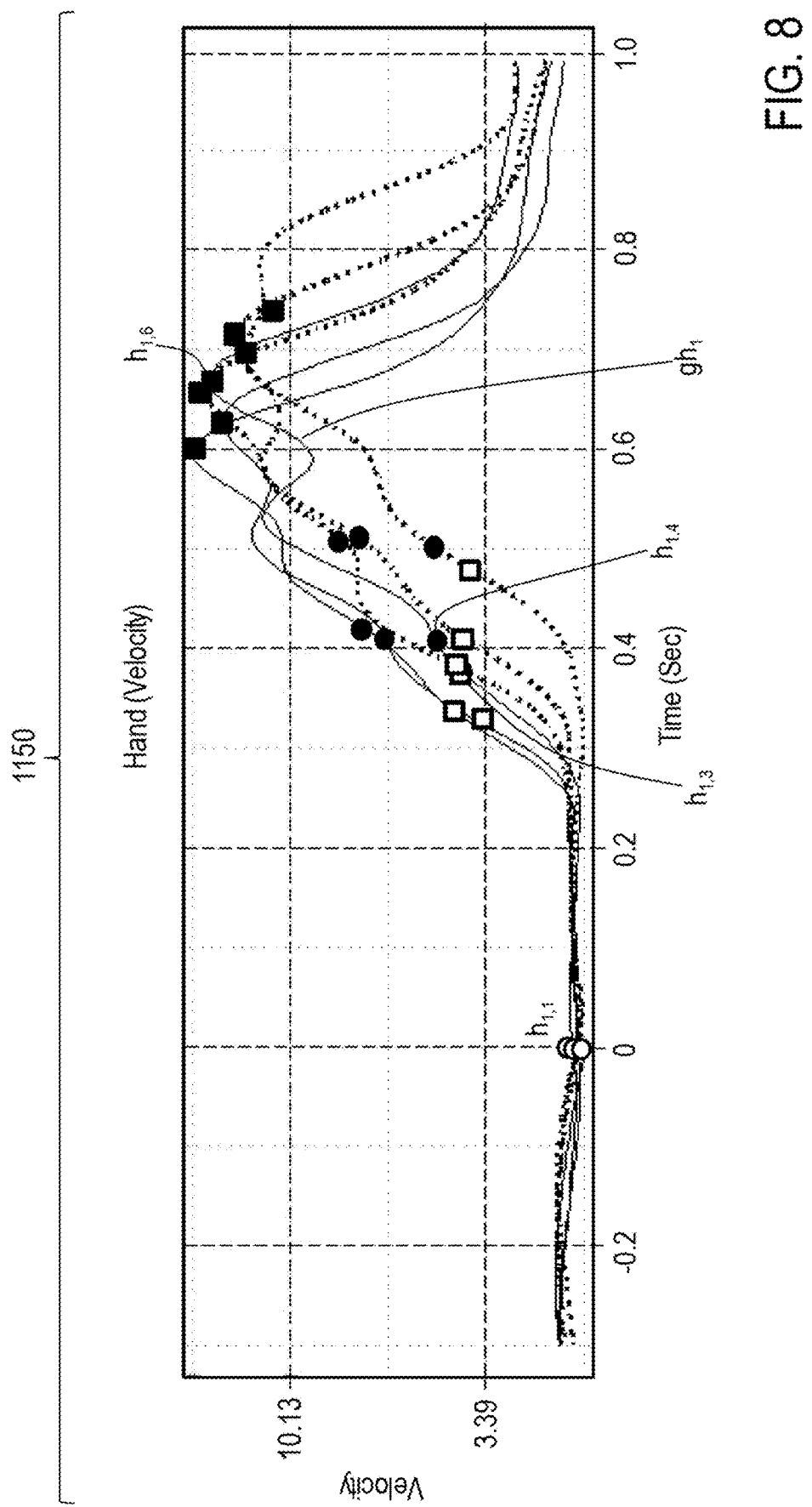
FIG. 8 is a diagram illustrating graphs (graphical information) of the embodiment.

Graph Display Fields 1140 and 1150:

As illustrated in FIGS. 7 and 8, in the graph display fields 1140 and 1150, graphs (pieces of visible graphical information) of time-series motion data of records are displayed. The graphs in the graph display field 1140 correspond to the sequences $m_1, \ldots, m_I$ and graphically show the tangential velocity (a physical quantity), which indicates a rotary motion of the pelvis of a batter, at relative times. The graphs in the graph display field 1150 correspond to the sequences $m_1, \ldots, m_I$ and graphically show the tangential velocity (a physical quantity) which indicates a rotary motion of a hand of the batter, at relative times. In both the graph display field 1140 and the graph display field 1150, a solid graph shows the movement of the batter observed when a straight ball was pitched and a dashed graph shows the movement of the batter observed when a curve ball was pitched. A position on a horizontal axis (an axis that is parallel or substantially parallel to the X-axis) (a second axis) in a graph corresponds to a relative time, and a position on a vertical axis corresponds to the tangential velocity (a physical quantity). In the examples of FIGS. 7 and 8, an X coordinate value indicating each position on a horizontal axis monotonically increases with an increase in a relative time, and there is a linear relationship between the X coordinate value and the relative time. In positions, which correspond to the pitch time br, the arrival time zt, and the motion actor times ps and pp, in each graph in the graph display field 1140, marks $p_{i,\ 1}$, $p_{i,\ 4}$, $p_{i,\ 2}$, and $p_{i,\ 5}$ (pieces of visible graphic information corresponding to positions on an axis which correspond to the motion actor times in a sequence) are displayed, the marks $p_{i,\ 1}$, $p_{i,\ 4}$, $p_{i,\ 2}$, and $p_{i,\ 5}$ being the same as the marks $m_{i,\ 1}$, $m_{i,\ 4}$, $m_{i,\ 2}$, and $m_{i,\ 5}$ of the sequence $m_i$, which are placed in positions corresponding to the pitch time br, the arrival time zt, and the motion actor times ps and pp, in the event time map field 1120. Likewise, in positions, which correspond to the pitch time br, the arrival time zt, and the motion actor times ss and sp, in each graph in the graph display field 1150, marks $h_{i,\ 1}$, $h_{i,\ 4}$, $h_{i,\ 3}$, and $h_{i,\ 6}$ (pieces of visible graphic information corresponding to positions on an axis which correspond to the motion actor times, in a sequence) are displayed, the marks $h_{i,\ 1}$, $h_{i,\ 4}$, $h_{i,\ 3}$, and $h_{i,\ 6}$ being the same as the marks $m_{i,\ 1}$, $m_{i,\ 4}$, $m_{i,\ 3}$, and $m_{i,\ 6}$ of the sequence $m_i$, which are placed in positions corresponding to the pitch time br, the arrival time zt, and the motion actor times ss and sp, in the event time map field 1120.

Since there is a linear relationship between an X coordinate value indicating each position on a horizontal axis in each graph and a relative time, the relative positional relationship between positions on a horizontal axis, which correspond to the pitch time br, the arrival time zt, and the motion actor times ps, pp, ss, and sp, is uniquely determined by the pitch time br, the arrival time zt, and the motion actor times ps, pp, ss, and sp. On the other hand, absolute positions (that is, X coordinate values) on a horizontal axis, which correspond to the pitch time br, the arrival time zt, and the motion actor times ps, pp, ss, and sp, in each graph are determined only after the determination of a relative time corresponding to a reference position (for example, the time origin) on the horizontal axis. In the present embodiment, the reference position is the time origin on the horizontal axis and a relative time corresponding to the time origin on the horizontal axis is the same as a relative time corresponding to the above-described time origin on the axis $ax_i$. That is, in this example, in the initial state, the pitch time br corresponds to the time origin on the horizontal axis. In this case, as illustrated in FIG. 7, each mark $p_{i,\ 1}$ corresponding to the pitch time br (a position on a second axis, which corresponds to the pitch time br, in each of I (a plurality of) pieces of graphical information) lies at the time origin of each graph in the graph display field 1140. Likewise, as illustrated in FIG. 8, each mark $h_{i,\ 1}$ corresponding to the pitch time br (a position on a second axis, which corresponds to the pitch time br, in each of I (a plurality of) pieces of graphical information) lies at the time origin of each graph in the graph display field 1150.

<<Selection Button Press Processing (Step S117)>>

Figure 9:
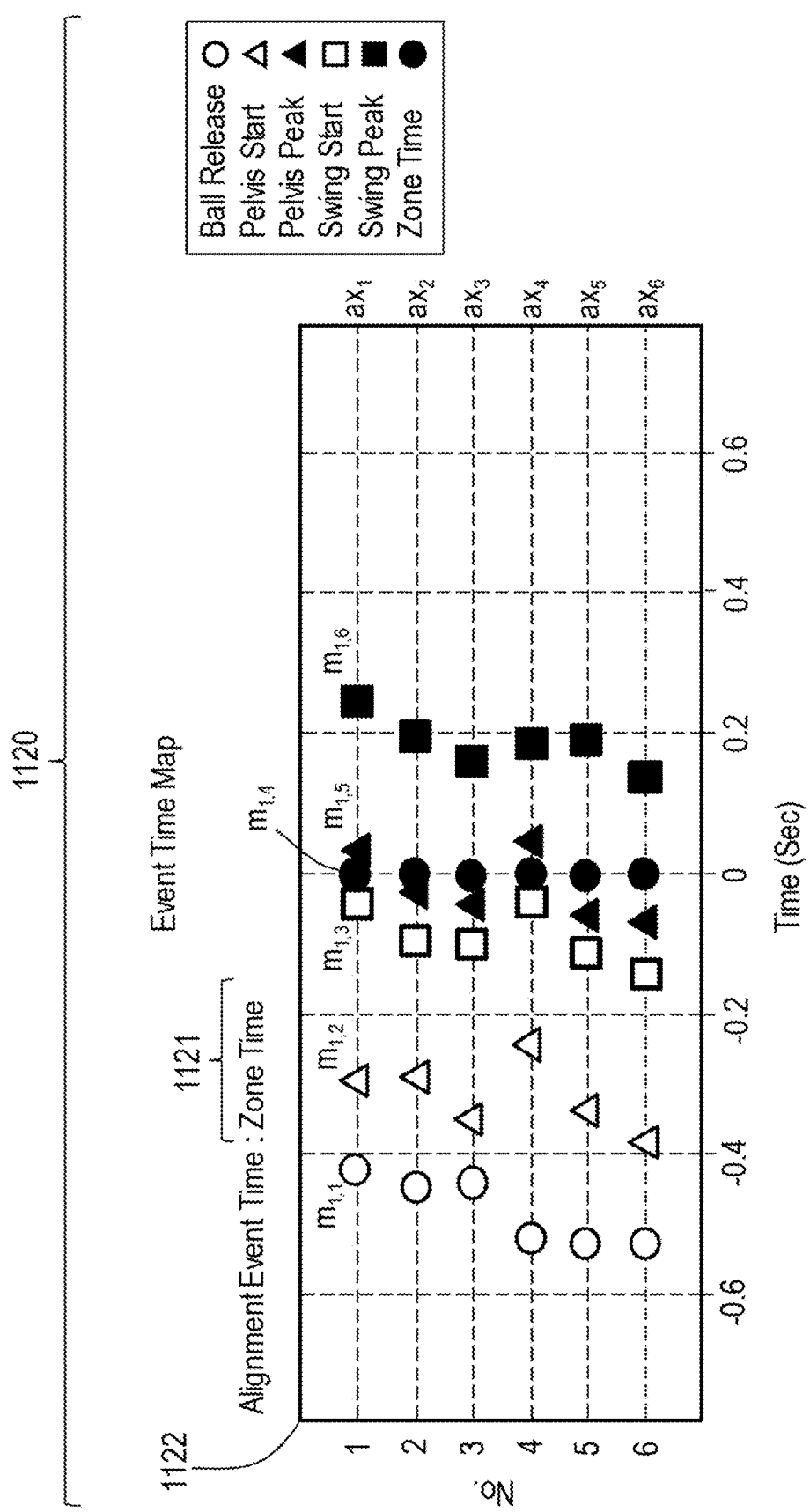
FIG. 9 is a diagram illustrating mark sequences (visible sequences) of the embodiment.

When the user presses any one of the selection buttons 1111 to 1116 in the image 1100 by using the input apparatus 130, information about the pressed selection button is transmitted to the generation control unit 117 from the interface unit 116. The generation control unit 117 transmits the information about the pressed selection button to the image generation unit 115 and provides an instruction thereto to set a relative time corresponding to the pressed selection button as a relative time corresponding to the time origin (a reference position). In response to this instruction, the image generation unit 115 sets a relative time corresponding to the pressed selection button as a relative time corresponding to the time origin. For instance, when the selection button 1116 corresponding to the arrival time zt is pressed, the image generation unit 115 sets the arrival time zt as a relative time corresponding to the time origin. The image generation unit 115 generates the event time map field 1120, graphs in the graph display field 1140, and graphs in the graph display field 1150, in which a relative time corresponding to the pressed selection button is set as a relative time corresponding to the time origin, and outputs the image 1100 including them. The image 1100 is transmitted to the interface unit 116, and the interface unit 116 transmits the image 1100 to the display apparatus 120. The display apparatus 120 outputs the image 1100, which was transmitted thereto, in a visual and visible way. For instance, when the selection button 1116 corresponding to the arrival time zt is pressed, the display apparatus 120 outputs the image 1100 including the event time map field 1120 illustrated in FIG. 9. That is, when a selection button is pressed, each sequence $m_i$ of a plurality of sequences is displayed in an image such that positions, each being a position on an axis $ax_i$ in each sequence $m_i$ of the plurality of sequences and corresponding to a relative time corresponding to the pressed selection button, are aligned. Likewise, when the selection button is pressed, a plurality of graphs are displayed in the image such that positions on horizontal axes, which correspond to the relative time corresponding to the pressed selection button, in the plurality of graphs are aligned.

Features of the Embodiment

As described above, in the present embodiment, the positional relationship between each mark $m_{i,\,1}$, which corresponds to the pitch time br and is placed at the time origin on each axis $ax_i$ in a linear arrangement, and the other marks $m_{i,\,2}, \ldots, m_{i,\,6}$ corresponding to the arrival time zt and the motion actor times ps, pp, ss, and sp is visualized in the event time map field 1120 of the image 1100. This makes possible intuitive perception of the relative relationship between the pitch time br and the arrival time zt and the motion actor times ps, pp, ss, and sp in each record. As a result, it is possible to visualize the timing (such as the timing of the start of movement) of the movement of a part of the body of a batter at the time of batting performed by him/her in response to a pitched ball and make an objective comparison between batting motions of the batter.

For example, by displaying the mark $m_{i,\,1}$ corresponding to the pitch time br and the mark $m_{i,\,4}$ corresponding to the arrival time zt, it is possible to visualize the speed of a pitched ball, which allows an intuitive grasp of the timing of the movement of the body of a batter and a point in the behavior of the ball with which he/she coordinated the movement. Moreover, it is important to visualize, of the motion actor times, a motion actor time (for example, the motion actor times ps and ss) corresponding to the starting time of a movement, because this makes possible clear perception of the timing of the movement of a batter. Furthermore, since the trunk is used in a batting motion to generate force, it is important to visualize a rotary motion of the waist. Moreover, by visualizing rotary motions of a hand and the waist, it is possible to visualize information about whether a batting motion is a batting motion of a batter who is fully using his/her trunk or a batting motion (what is called hitting a ball using mainly the hands and arms) of a batter who is using mainly his/her hands without fully using his/her trunk.

Furthermore, by visualizing in the above-described manner a plurality of records obtained when pitches of different pitch types (for instance, a straight ball and a curveball) were made to one batter, it is possible to make an objective comparison between differences, which were caused by a difference in pitch type, in the timing of the movement of a region of the body of the batter. For example, the following sequences $m_{i1}$ and $m_{i2}$ may be displayed side by side on different axes $ax_{i1}$ and $ax_{i2}$ in the event time map field 1120 of the image 1100. Here, i1, i2∈{1, . . . , I} and i1≠i2 hold.

The sequence $m_{i1}$ is a sequence of J marks $m_{i1,\,1}, \ldots, m_{i1,\,J}$ that graphically show at least a position on the axis $ax_{i1}$ which corresponds to the pitch time br that is a relative time at which a pitch of a first pitch type (for instance, a straight ball) was made to a batter (a first batter), a position on the axis $ax_{i1}$ which corresponds to the arrival time zt that is a relative time at which the ball of the first pitch type reached a predetermined position near a batter's box where the batter stands, and positions on the axis $ax_{i1}$ which correspond to the motion actor times ps and ss that are relative times at which a rotary motion of a part of the body of the batter or an object that moves with the part of the body was started in response to the pitch of the first pitch type.

The sequence $m_{i2}$ is a sequence of J marks $m_{i2,\,1}, \ldots, m_{i2,\,J}$ that graphically show at least a position on the axis $ax_{i2}$ which corresponds to the pitch time br that is a relative time at which a pitch of a second pitch type (for instance, a curveball), which is different from the first pitch type, was made to the first batter, a position on the axis $ax_{i2}$ which corresponds to the arrival time zt that is a relative time at which the ball of the second pitch type reached the predetermined position near the batter's box where the batter stands, and positions on the axis $ax_{i2}$ which correspond to the motion actor times ps and ss that are relative times at which a rotary motion of the part of the body of the first batter or the object that moves with the part of the body was started in response to the pitch of the second pitch type.

This makes it possible to visualize a difference between the timing of the movement of a region of the body of a batter who responded to a straight ball and the timing of the movement of the region of the body of the batter who responded to a curveball.

Second Embodiment

Next, a second embodiment will be described. In addition to the pitch time, the arrival time, and the motion actor times illustrated in the first embodiment, a specific point in time in a series of pitcher's pitch motions (for instance, raising his/her leg, moving forward, planting his/her foot on the ground, and a ball release) may be visualized. The following description mainly deals with a difference from the first embodiment, and explanations of matters that have already been explained will be simplified using the same reference characters.

<Configuration>
<<Motion Information Apparatus 210>>

As illustrated in FIG. 1, a motion information apparatus 210 of the present embodiment includes a storage 111, a search processing unit 112, an image generation unit 215, an interface unit 116, a generation control unit 217, and a control unit 118.

<<Storage of Motion Data>>

As in the case of the first embodiment, batting data which is data acquired when a batter performed batting in response to a ball thrown by a pitcher is stored in the storage 111 in advance as an electronic file of a table made up of a plurality of records, for example. Each record of the table stored in the storage 111 is, for example, a record obtained by correlating a date and time, a pitcher identifier, a batter identifier, a pitch type, a pitch time, an arrival time, a motion actor time, time-series motion data, and, in addition to them, a pitch motion time, which is a relative time of a specific point in time in a series of pitcher's pitch motions, of each batting data with one another. Hereinafter, each data about a pitch motion time contained in the record will be described.

(H) Foot Raising Time

A foot raising time is the time (a foot raising time) at which a front foot (a left foot if a pitcher is a right-handed pitcher) of a pitcher who started a pitch was moved away from the ground and is sometimes written as "rf" in the following description. The foot raising time rf is, for example, the time at which the magnitude of a physical quantity of motion data, which indicates a motion of a front foot of a pitcher, exceeded a predetermined threshold; for example, the foot raising time rf is the time at which the magnitude of the movement of a front foot of a pitcher exceeded a predetermined threshold, the time at which the magnitude of an acceleration vector derived from a physical quantity indicating the acceleration of a front foot of a pitcher exceeded a predetermined threshold, or the time at which the magnitude of a velocity vector derived from a physical quantity indicating the speed of a front foot of a pitcher exceeded a predetermined threshold. In the following description, the foot raising time rf is a relative time, with respect to a "base point in time", of the time at which a physical quantity indicating a motion of a front foot of a pitcher exceeded a predetermined threshold.

(I) Knee's Peak Arrival Time

A knee's peak arrival time is the time (a maximum foot raising time) at which, after a front foot was raised, the knee of a front leg reached the highest position and is sometimes written as "pf" in the following description. The knee's peak arrival time pf is, for example, the time at which the magnitude of a physical quantity of motion data, which indicates the position of a front foot of a pitcher, exceeded a predetermined threshold; for example, the time at which the position of the knee of a front leg of a pitcher exceeded a threshold is set as the maximum foot raising time. In the following description, the knee's peak arrival time pf is a relative time, with respect to a "base point in time", of the time at which the magnitude of a physical quantity of motion data, which indicates the position of a front foot of a pitcher, exceeded a predetermined threshold.

(J) Ground-Touch Time

A ground-touch time is the time (a ground-touch time) at which, after a front foot was raised, the front foot touched the ground and is sometimes written as "tf" in the following description. The ground-touch time tf is the time at which the magnitude of a physical quantity of motion data, which indicates a motion of a front foot of a pitcher, became zero for the first time after the magnitude peaked (with an action by which the front foot was raised); for example, the ground-touch time tf is the time at which the magnitude of a velocity vector of a front foot of a pitcher became zero for the first time after the magnitude reached a peak speed. In the following description, the ground-touch time tf is a relative time, with respect to a "base point in time", of the time at which the magnitude of a physical quantity indicating a motion of a front foot of a pitcher became zero for the first time after the magnitude peaked.

<Motion Information Output Processing>

The second embodiment differs from the first embodiment only in the image generation processing, the image output processing, and the selection button press processing. The following description deals only with the image generation processing, the image output processing, and the selection button press processing of the present embodiment.

<<Image Generation Processing (Step S215)>>

The image generation unit 215 generates the following image 1100 that visualizes the record transmitted thereto.

<<Image Output Processing (Step S216)>>

The image generation unit 215 transmits the generated image 1100 to the interface unit 116, and the interface unit 116 transmits the image 1100 to the display apparatus 120. The display apparatus 120 outputs the image 1100, which was transmitted thereto, in a visual and visible way (for instance, displays the image 1100). The second embodiment differs from the first embodiment in that selection buttons corresponding to the pitch motion times rf, pf, and tf may also be displayed in the selection button field 1110 and a sequence $m_i$ in the event time map field 1120 may include a mark corresponding to at least one pitch motion time of the pitch motion times rf, pf, and tf. The marks included in the sequence $m_i$ and corresponding to the pitch motion times rf, pf, and tf are placed in positions on each axis $ax_i$, which correspond to the pitch motion times rf, pf, and tf. Furthermore, a graph (visible graphical information) of time-series motion data of a pitcher of each record may be displayed. For example, a graph showing the movement of an arm, a foot, the waist, or the like of a pitcher may be displayed. In this case, in positions which correspond to the pitch motion times rf, pf, and tf, in the graph showing the movement of an arm, a foot, the waist, or the like of a pitcher, marks (pieces of visible graphic information corresponding to positions on an axis, which correspond to the pitch motion times, in a sequence) may be displayed, the marks being the same as the marks placed in positions on each axis $ax_i$ which correspond to the pitch motion times rf, pf, and tf, in the event time map field 1120.

<<Selection Button Press Processing (Step S217)>>

When a selection button corresponding to any one of the pitch motion times rf, pf, and tf is depressed, the generation control unit 217 transmits information about the pressed selection button to the image generation unit 215 and provides an instruction thereto to set a relative time corresponding to the pressed selection button as a relative time corresponding to the time origin (a reference position). In response to this instruction, the image generation unit 215 sets a relative time corresponding to the pressed selection button as a relative time corresponding to the time origin. The other processing is the same as that described in Step S117 of the first embodiment.

Other Modifications and so Forth

It is to be noted that the present invention is not limited to the above-described embodiments. For example, motion data indicating the movement of the body of a batter is not limited to the motion data described above; motion data indicating the movement of other regions (legs and other various joints) may be acquired and visualized in a similar manner.

Moreover, in the above-described embodiments, times (such as a pitch time, an arrival time, a motion actor time, and a pitch motion time) of one record are visualized using one sequence. Alternatively, statistical values (for example, mean values, maximum values, or minimum values) of times of a plurality of records may be visualized using one sequence. The difficulty level of batting may be varied and statistical values of times of the records acquired at each difficulty level may be visualized using one sequence. The difficulty level of batting can be varied by conditions such as whether or not a batter is informed of a pitch type, a ball speed, whether only a strike is thrown, and whether a strike and a ball are randomly thrown.

In the above-described embodiments, positions corresponding to all the times (such as a pitch time, an arrival time, a motion actor time, and a pitch motion time) of a record are visualized in the event time map field 1120. Alternatively, a configuration that allows a time to be visualized in the event time map field 1120 (that is, a time whose mark is to be displayed in a corresponding position) to be selected from the times contained in a record may be adopted.

Furthermore, the image 1100 may also show a preset button. When the preset button is pressed by using the input apparatus 130, the setting of a sequence to be displayed in the event time map field 1120 may be set to that set in advance. For example, a relative time corresponding to a reference position (for example, the time origin) on an axis $ax_i$ may be set in advance (for example, the pitch time br) and, when the preset button is pressed, each sequence $m_i$ of a plurality of sequences is displayed in the image 1100 such that positions, each being a position on an axis $ax_i$ in each sequence $m_i$ of the plurality of sequences and corresponding to the relative time set in advance (for example, the pitch time br), are aligned. In addition to those described above, of the times (such as a pitch time, an arrival time, a motion actor time, and a pitch motion time) contained in a record, a time to be visualized in the event time map field 1120 may be set in advance and, when the preset button is pressed, the time set in advance may be visualized in the event time map field 1120.

Any combination of a pitcher, a batter, and a pitch type can be used. For example, records obtained when pitches of a plurality of pitch types were made at a combination of one pitcher and one batter may be acquired, records obtained when pitches of a plurality of pitch types were made at a combination of a specific pitcher and a plurality of types of batters may be acquired, or records obtained when a plurality of batters each made a batting motion in response to a pitch of one pitch type made by a specific pitcher may be acquired.

A configuration may be adopted in which the above-described graph display fields 1140, 1150 or record information display field 1130 are not displayed.

The above-described various kinds of processing may be executed, in addition to being executed in chronological order in accordance with the descriptions, in parallel or individually depending on the processing power of an apparatus that executes the processing or when necessary. In addition, it goes without saying that changes may be made as appropriate without departing from the spirit of the present invention.

The above-described motion information apparatus is embodied by execution of a predetermined program by a general- or special-purpose computer having a processor (hardware processor) such as a central processing unit (CPU), memories such as random-access memory (RAM) and read-only memory (ROM), and the like, for example. The computer may have one processor and one memory or have multiple processors and memories. The program may be installed on the computer or pre-recorded on the ROM and the like. Also, some or all of the processing units may be embodied using an electronic circuit that implements processing functions without using programs, rather than an electronic circuit (circuitry) that implements the functional configuration by loading of programs like a CPU. An electronic circuit constituting a single apparatus may include multiple CPUs. It is to be noted that the information obtained in each unit is stored in temporary memory one by one and is read therefrom when necessary and used.

When the above-described configurations are implemented by a computer, the processing details of the functions supposed to be provided in each apparatus are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage unit of a server computer and transferring the program to other computers from the server computer via a network.

The computer that executes such a program first, for example, temporarily stores the program recorded on the portable recording medium or the program transferred from the server computer in a storage unit thereof. At the time of execution of processing, the computer reads the program stored in the storage unit thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

Instead of executing a predetermined program on the computer to implement the processing functions of the present apparatus, at least some of the processing functions may be implemented by hardware.

DESCRIPTION OF REFERENCE NUMERALS

110, 210 motion information apparatus

What is claimed is:

1. A motion information apparatus for displaying motion information of a batter who makes a batting motion in response to a pitch, wherein
the motion information apparatus comprises processing circuitry configured to output an image showing one sequence which is visible or a plurality of sequences which are visible, a relative time, which is a position on a relative time axis, corresponds to a position on a specific axis of the image, and the one sequence or each of the plurality of sequences graphically shows at least a position on the axis which corresponds to a pitch time that is a relative time at which a certain pitch was made to a certain batter, a position on the axis which corresponds to an arrival time that is a relative time at which a ball which is thrown by the certain pitch reached a predetermined position near a batter's box where the certain batter stands, and a position on the axis which corresponds to a motion actor time that is a relative time at which a rotary motion of a part of a body of the certain batter or an object that moves with the part of the body was started in response to the certain pitch.

2. The motion information apparatus according to claim 1, wherein the plurality of sequences are displayed side by side on different axes of the image, selection buttons corresponding to a plurality of relative times including the pitch time, the arrival time, and the motion actor time, which is at least one motion actor time, are also displayed in the image, and when any one of the selection buttons is pressed, the plurality of sequences are displayed in the image such that positions on the axes which correspond to a relative time corresponding to the pressed selection button in the plurality of sequences are aligned.

3. The motion information apparatus according to claim 1, wherein the plurality of sequences include a first sequence graphically showing at least a position on the axis which corresponds to a pitch time that is a relative time at which a pitch of a first pitch type was made to a first batter, a position on the axis which corresponds to an arrival time that is a relative time at which a ball of the first pitch type reached a predetermined position near a batter's box where the first batter stands, and a position on the axis which corresponds to a motion actor time that is a relative time at which a rotary motion of a part of a body of the first batter or an object that moves with the part of the body was started in response to the pitch of the first pitch type, and a second sequence graphically showing at least a position on the axis which corresponds to a pitch time that is a relative time at which a pitch of a second pitch type which is different from the first pitch type was made to the first batter, a position on the axis which corresponds to an arrival time that is a relative time at which a ball of the second pitch type reached the predetermined position near the batter's box where the first batter stands, and a position on the axis which corresponds to a motion actor time that is a relative time at which a rotary motion of the part of the body of the first batter or the object that moves with the part of the body was started in response to the pitch of the second pitch type, and the first sequence and the second sequence are displayed side by side on different axes of the image.

4. The motion information apparatus according to claim 1, wherein one piece of graphical information which is visible or a plurality of pieces of graphical information which are visible are also displayed in the image, and the one piece of graphical information or each of the plurality of pieces of graphical information graphically shows a physical quantity which indicates the rotary motion at each relative time.

5. The motion information apparatus according to claim 4, wherein in the image, at least the plurality of pieces of graphical information and selection buttons corresponding to a plurality of relative times including the pitch time, the arrival time, and the motion actor time, which is at least one motion actor time, are displayed, a relative time corresponds to a position on a specific second axis of the image, and when any one of the selection buttons is pressed, the plurality of pieces of graphical information are displayed in the image such that positions on the second axes which correspond to a relative time corresponding to the pressed selection button in the plurality of pieces of graphical information are aligned.

6. The motion information apparatus according to claim 4, wherein in a position corresponding to the motion actor time, which is at least one motion actor time, in the graphical information, a piece of visible graphic information corresponding to the position on the axis which corresponds to the motion actor time in the sequence is displayed.

7. The motion information apparatus according to claim 1, wherein the part of the body of the batter is a waist and/or a hand of the batter.

8. A motion information apparatus that displays motion information of a motion actor who makes a motion in response to a motion of at least one moving body other than him/herself, wherein the motion information apparatus comprises processing circuitry configured to output an image showing one sequence which is visible or a plurality of sequences which are visible, a relative time which is a position on a relative time axis corresponds to a position on a specific axis of the image, and the one sequence or each of the plurality of sequences graphically shows at least a position on the axis which corresponds to a moving body time that is a relative time at which at least one predetermined motion of the moving body was made, and a position on the axis which corresponds to a motion actor time that is a relative time at which at least one predetermined motion of the motion actor was made.

9. A non-transitory computer-readable recording medium storing a program for making a computer function as the motion information apparatus according to claim 1 or 8.

10. The motion information apparatus according to claim 8, wherein the plurality of sequences are displayed side by side on different axes of the image, selection buttons corresponding to a plurality of relative times including the moving body time which is at least one moving body time, and the motion actor time which is at least one motion actor time are also displayed in the image, and when any one of the selection buttons is pressed, the plurality of sequences are displayed in the image such that positions on the axes which correspond to a relative time corresponding to the pressed selection button in the plurality of sequences are aligned.

11. A method for a motion information apparatus for displaying motion information of a batter who makes a batting motion in response to a pitch, the method comprising:

outputting an image showing one sequence which is visible or a plurality of sequences which are visible, wherein a relative time which is a position on a relative time axis corresponds to a position on a specific axis of the image, and the one sequence or each of the plurality of sequences graphically shows at least a position on the axis which corresponds to a pitch time that is a relative time at which a certain pitch was made to a certain batter, a position on the axis which corresponds to an arrival time that is a relative time at which a ball which is thrown by the certain pitch reached a predetermined position near a batter's box where the certain batter stands, and a position on the axis which corresponds to a motion actor time that is a relative time at which a rotary motion of a part of a body of the certain batter or an object that moves with the part of the body was started in response to the certain pitch.

12. A method for a motion information apparatus that displays motion information of a motion actor who makes a motion in response to a motion of at least one moving body other than him/herself, the method comprising:

an output step of outputting an image showing one sequence which is visible or a plurality of sequences which are visible, wherein a relative time which is a position on a relative time axis corresponds to a position on a specific axis of the image, and the one sequence or each of the plurality of sequences graphically shows at least a position on the axis which corresponds to a moving body time that is a relative time at which at least one predetermined motion of the moving body was made, and a position on the axis which corresponds to a motion actor time that is a relative time at which at least one predetermined motion of the motion actor was made.

* * * * *